United States Patent
Matsuyama (10) Patent No.: US 8,050,216 B2
(45) Date of Patent: Nov. 1, 2011

(54) COMMUNICATION TERMINAL AND COMMUNICATION METHOD THEREOF

(75) Inventor: Mariko Matsuyama, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 931 days.

(21) Appl. No.: 11/460,199

(22) Filed: Jul. 26, 2006

(65) Prior Publication Data

US 2007/0178874 A1 Aug. 2, 2007

(30) Foreign Application Priority Data

Jul. 27, 2005 (JP) .............................. P.2005-216857

(51) Int. Cl.
*H04W 4/00* (2009.01)
*H04B 1/38* (2006.01)
*G06F 15/16* (2006.01)
*G06F 1/26* (2006.01)

(52) U.S. Cl. ........ 370/328; 370/311; 455/574; 709/227; 709/228; 713/320

(58) Field of Classification Search .................. 455/574, 455/522, 343.2; 370/328, 338, 311; 709/227, 709/228; 713/300, 320, 323, 324
See application file for complete search history.

(56) References Cited

U.S. PATENT DOCUMENTS

| | | | |
|---|---|---|---|
| 7,477,898 B2 | 1/2009 | Hidaka | |
| 2002/0196755 A1 | 12/2002 | Hidaka et al. | |
| 2004/0023679 A1* | 2/2004 | Shoobridge | 455/522 |
| 2004/0165587 A1* | 8/2004 | Kiyoto et al. | 370/389 |
| 2005/0096050 A1 | 5/2005 | Hidaka | |
| 2005/0266895 A1* | 12/2005 | Okamoto et al. | 455/572 |
| 2008/0004071 A1 | 1/2008 | Hidaka et al. | |

FOREIGN PATENT DOCUMENTS

| | | |
|---|---|---|
| JP | 2002-345019 | 11/2002 |
| JP | 2003-092782 | 3/2003 |
| JP | 2005026900 A | 1/2005 |
| JP | 2005136616 A | 5/2005 |
| JP | 2005151504 A | 6/2005 |

OTHER PUBLICATIONS

Japanese language office action dated Jun. 29, 2010 and its English language translation for corresponding Japanese application 2005216857.
Chinese language office action dated May 6, 2011 and its English language translation for corresponding Chinese application 200610108052.6.

* cited by examiner

*Primary Examiner* — George Eng
*Assistant Examiner* — Marcos Torres
(74) *Attorney, Agent, or Firm* — DLA Piper LLP (US)

(57) ABSTRACT

It is a communication terminal including an EVDO radio control portion 1172 adapted to perform a radio communication control operation according to an EVDO communication system. When a data link is released by issuing a power-supply-off instruction during an EVDO communication, the EVDO radio communication portion 1172 is not caused to release a communication session. When the release of a data link is not based on a power-supply-off instruction, the EVDO radio control portion 1172 is caused to release a communication session and to perform reestablishment of a communication session.

7 Claims, 5 Drawing Sheets

COMMUNICATION TERMINAL AND COMMUNICATION METHOD THEREOF

TECHNICAL FIELD

The present disclosure relates to a communication terminal for performing radio communications, such as a mobile telephone, and a communication method thereof. More particularly, the present disclosure relates to a communication terminal configured to have transmission and reception functions corresponding to a plurality of radio communication systems such as CDMA2000 1x and CDMA2000 1xEVDO (1x Evolution Data Only), and also configured to perform radio communication according to any of the communication systems, and also relates to a communication method for the communication terminal.

RELATED ART

In recent years, a radio communication terminal, such as a mobile phone, enabled to use a plurality of radio networks has been put to practical use. This kind of a radio communication terminal is configured so that communication quality information, such as a communication speed, can be displayed.

Also, a CDMA2000 1xEVDO (1x EVolution Data Only) is about being put to practical use as a high-speed radio communication system.

Regarding the communication quality information of the CDMA2000 1x communication system having now been in widespread use, change in the data communication speed according to the location is not so noticeable. Thus, the determination of a reception condition is based on instantaneous values of the ratio of the strength of a pilot signal received from a base station to total received-signal strength ($E_c/I_o$), and a carrier-to-interference ratio (CIR).

Meanwhile, the communication quality information of the CDMA2000 1xEVDO communication system is obtained by averaging a data communication speed (DRC: Data Rate Control Bit) estimated at a radio communication terminal according to the reception condition (that is, received electric field strength or C/I (Carrier to Interference)) and is notified to a user by being displayed in a display portion (see, for example, Japanese Patent Unexamined Publication No. 2002-345019 and Japanese Patent Unexamined Publication No. 2003-92782).

This enables users of a radio communication terminal employing the CDMA2000 1xEVDO communication system to accurately know a communication state.

Hereinafter, the difference between a radio communication performed according to the CDMA2000 1x communication system and that performed according to the CDMA2000 1xEVDO communication system in the case of performing data communications utilizing the communication terminal is described below with reference to FIGS. 5 and 6.

Figure 5:
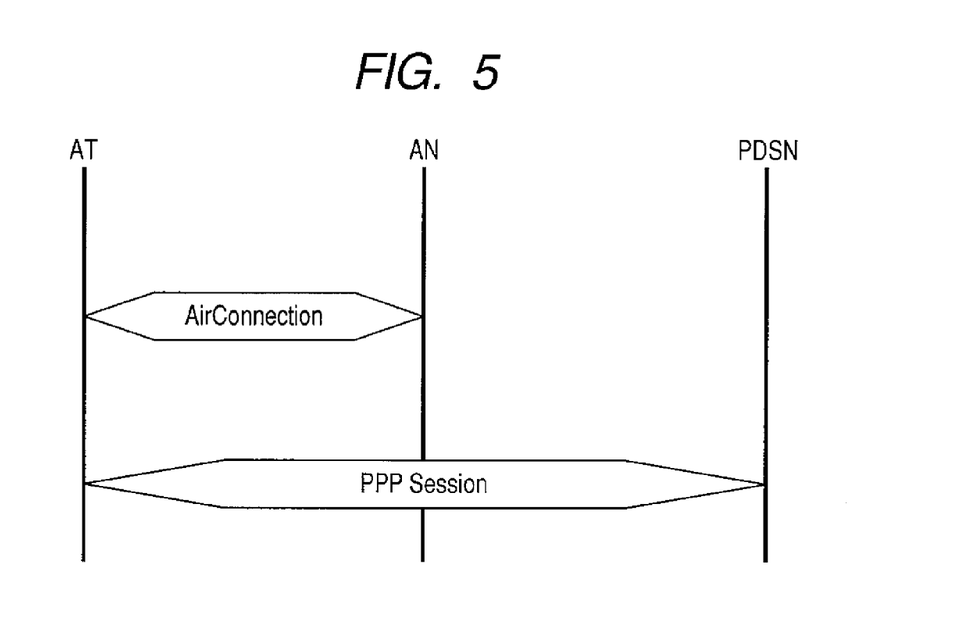
FIG. 5 is an explanatory diagram illustrating a case where a radio communication is performed according to a CDMA2000 1x communication system.

FIG. 5 is a schematic diagram illustrating the case of performing radio communications according to the CDMA2000 1x communication system. FIG. 6 is a schematic diagram illustrating the case of performing radio communications according to the CDMA2000 1xEVDO communication system.

Figure 6:
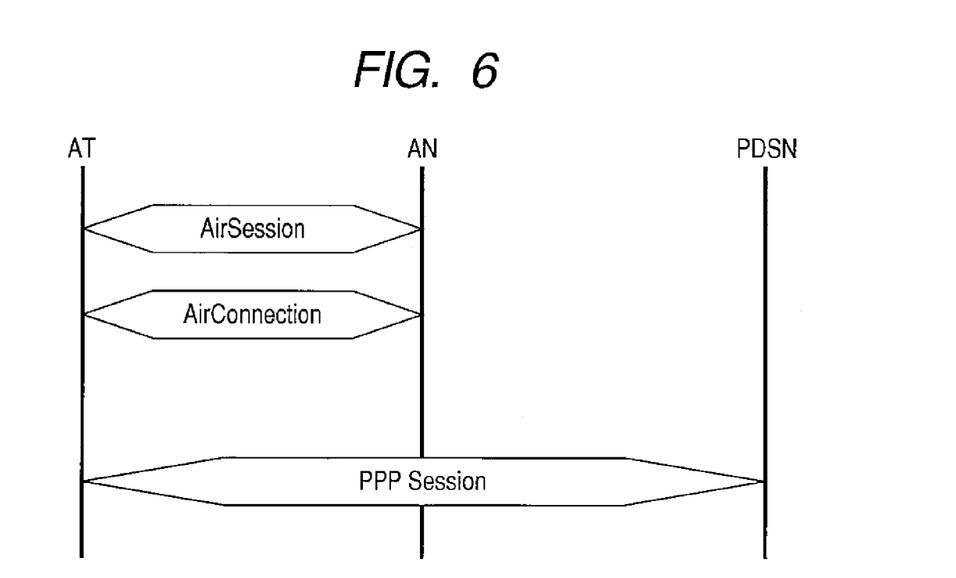
FIG. 6 is an explanatory diagram illustrating a case where a radio communication is performed according to a CDMA2000 1xEVDO communication system.

First, it is necessary for performing radio communications to establish a link between a base station and a mobile station (radio communication terminal) as shown in FIGS. 5 and 6.

As shown in FIG. 5, in the case of performing radio communications according to the CDMA2000 1x communication system (hereunder referred to simply as the 1x communication system), it is necessary to establish a physical connection (air connection) and a data link (PPP session).

In contrast with this, as shown in FIG. 6, in the case of performing radio communications according to the CDMA2000 1xEVDO communication system (hereunder referred to simply as the EVDO communication system), it is necessary to establish a communication session (air session) in addition to the physical connection (air connection) and the data link (PPP session).

The term "data link" designates a PPP (Point to Point Protocol) link herein.

The physical connection is used for establishing a radio physical connection between the base station and a PDSN (Packet Data Serving Node, that is, a management unit at the side of a network 30 (see FIG. 1)). The physical connection is closest to a radio transmission used to actually start data communications. Also, the physical connection is established to achieve frequency synchronization, code synchronization and frame synchronization and to perform the subsequent data transfer. If communications are not performed, the physical connection is released as required. While the physical connection is established, a memory holds data to be used to obtain physical radio synchronization between the base station and the PDSN. When communications are performed, a physical radio synchronization state is established by using such data.

The communication session exists only in the EVDO communication system and is established for sharing setting-data required to perform communications. The communication session is held in an established state to thereby omit a radio setting process at a communication start time.

According to the EVDO communication system, when the power supply is turned on, the communication session is always held. For example, in a case where speech communications are performed by the 1x communication system, the communication session is released. However, immediately after that, the communication session is held by performing a reconnection process.

According to the EVDO communication system, in a case where a lower-level radio connection is released, the communication session is not released. However, in a case where a higher-level data link is released, the communication session should be released.

According to the EVDO communication system, the communication session is not frequently released. Thus, when the communication session is established, parameters used for communications are transmitted to the network therefor. Also, the communication session is held in an established state, regardless of the presence/absence of the information to be communicated, to enable the system to instantly perform a data communication. Thus, it takes time to establish the communication session. Incidentally, the parameters are not used in the 1x communication system and are unique to the EVDO communication system, for example, values of the DRC set between the mobile station and the base station, the values of power used for the transfer, information specifying a sector in the base station used for communications, and information specifying a time slot to be used.

More particularly, at present, according to the EVDO communication system, the base station and the PDSN are adapted to be always connected to each other when the power supply is turned on. Also, the communication session is always held. Only when needed, the transition of a communication is quickly performed. What is called a standby mode is provided according to the 1x communication system, the start of a communication according to the EVDO communication system is notified according to the 1x communication system. Therefore, the start of a communication is performed according to the 1x communication system. Subsequently, the transition of the system to the EVDO communication system is performed. Then, a high speed data communication is performed.

It takes time to establish the communication session needed for the EVDO communication system during this transition.

Thus, data needed for the communication session is preliminarily transmitted to the network to thereby always establish the communication session. Additionally, only when needed, the physical connection is established. Then, data communications are performed. Consequently, the speedy transition of the communication system can be achieved with good responsibility.

Also, according to the 1x communication system, the communication session is not held, so that a setting process is performed when the radio connection is established (when communications are started). However, when the physical connection is disconnected, it is sufficient to perform only a release process.

In contrast, according to the EVDO communication system, the communication session is held. Thus, when the physical connection is established (when a communications is started), it is unnecessary to perform the setting process. Consequently, the connection can quickly be achieved.

However, when a data communication itself is terminated, the higher-level data link and the communication session are released. Immediately after that, the reestablishment process (reconnection process) of the communication session is performed.

However, normally, the reestablishment process is performed regardless of data communications. Users may care nothing about the establishment process of the communication session. Consequently, no problems arise.

Meanwhile, according to the EVDO communication system, when the communication is terminated in a state in which a data link is established, the communication session and the data link should be released.

In contrast with this, according to the 1x communication system, when the communication is terminated even in a state in which a data link is established, it is sufficient to perform a simple connection releasing process.

Similarly, according to the EVDO communication system, the process of releasing the physical connection and the communication session is performed. However, the process of establishing the subsequent communication session is also performed.

A time taken to establish the communication session at that time is longer than a permissible time (for example, 3 to 5 seconds) for turning off power supply (for instance, in a case where a power supply for each block provided in the communication terminal is turned off, and where the power supply is turned off when an operation of writing data to the memory and when the execution of a program is terminated).

Therefore, in a case where a related method of turning off the power supply for a communication terminal operating according to the 1x communication system is applied without change, and where a process of forcibly turning off the power supply is started at the establishment of a communication session (for example, a power-supply-off button is depressed), when the communication session is released, the process of performing reestablishment of a communication session on the network is started together with the process of turning off the power supply. Thus, the power supply is turned off before the reestablishment of the communication session is completed. Consequently, the transfer of a communication signal cannot be performed. Also, a protocol sequence is interrupted, so that an unnecessary load is placed on the network that including the base station that performs communications.

SUMMARY

Embodiments of the present invention provide a communication terminal and a communication method, which are enabled to omit a process of reestablishing a communication session when a power supply is turned off, and to reduce a time required to turn off the power supply.

According to a first aspect of one or more embodiments of the invention, there is provided a communication terminal comprising a radio control portion which performs a radio communication according to a communication system adapted to establish a communication session by sending a parameter used for a communication to a network, and also performs a reconnection process even when the communication session is released to keep the communication session established, regardless of presence/absence of information to be communicated, wherein when turning-off of a power supply for the communication terminal is instructed in a state in which the communication session is established, the radio control portion turns off the power supply without performing a process of releasing the communication session.

According to a second aspect of one or more embodiments of the invention, there is provided a communication terminal comprising a radio control portion which performs a radio communication according to a communication system adapted to perform a communication by sequentially establishing a radio physical connection, a communication session, which determines a communication condition by sending a parameter used for a communication to a network, and a data link, which transmits and receives data, between the network and the communication terminal, and also performs a reconnection process when the communication session is released to keep the communication session established, regardless of presence/absence of information to be communicated, wherein when turning-off of a power supply for the communication terminal is instructed in a state in which the communication session is established, the radio control portion releases the data link and turns off the power supply without performing a process of releasing the communication session.

According to a third aspect of one or more embodiments of the invention, there is provided a communication terminal comprising a radio control portion which performs a radio communication according to a first communication system adapted to perform a communication by establishing a radio physical connection between a network and the communication terminal, and then sending a parameter used for a communication to the network to thereby establish a communication session, and subsequently establishing, when data transfer is caused, a data link, and also performs a radio communication according to a second communication system adapted to share at least a part of a transmitting/receiving portion with the first communication system, to send the parameter to the network when the physical connection is established and to perform a communication by establishing a data link when data transfer is caused, wherein when the communication session is released, the radio control portion performs a reconnection process to keep the communication session established, regardless of presence/absence of data to be communicated, and when turning-off of a power supply for the communication terminal is instructed in a state in which the communication session and the data link are established, the radio control portion releases the data link and turns off the power supply without performing a process of releasing the communication session.

Preferably, an embodiment of the communication terminal of the invention features that the radio control portion performs a standby operation according to the second communication system, and that when transition of the second communication system to the first communication system is instructed according to the second communication system, the establishment of the data link is enabled according to the first communication system.

Also, preferably, an embodiment of the communication terminal of the invention features that the radio control portion reestablishes, when an operation of turning on the power supply is instructed after the power supply is turned off, the communication session in a case where the parameter relating to the communication session which is established before the power supply is turned off is left in the network.

According to a fourth aspect of one or more embodiments of the invention, there is provided a communication method performed in a communication terminal comprising a radio control portion which performs a radio communication according to a communication system adapted to perform a communication by sequentially establishing a radio physical connection, a communication session, which determines a communication condition by sending a parameter used for a communication to a network, and a data link which transmits and receives data, between the network and the communication terminal, and also performs a reconnection process, regardless of presence/absence of information to be communicated, the communication method comprising: causing the radio control portion to receive a power-supply-off instruction; and releasing the data link without releasing the communication session when the power supply is turned off in a state in which the data link is established.

Preferably, an embodiment of the communication method performed in a communication terminal features that this embodiment further comprises: causing the radio control portion to receive a power-supply-on instruction; when the power supply is turned on, causing the radio control portion to establish the physical connection; and when the physical connection is established, causing the radio control portion to reestablish the communication session in a case where the parameter relating to the communication session which is established before the power supply is turned off is left in the network.

Various implementations may include one or more the following advantages. For example, a process of reestablishing a communication session can be omitted when a power supply is turned off. Also, a time required to turn off the power supply can be reduced. The power supply can instantly be turned off.

Other features and advantages may be apparent from the following detailed description, the accompanying drawings and the claims.

DETAILED DESCRIPTION

Hereinafter, an embodiment of the invention is described with reference to the accompanying drawings.

Figure 1:
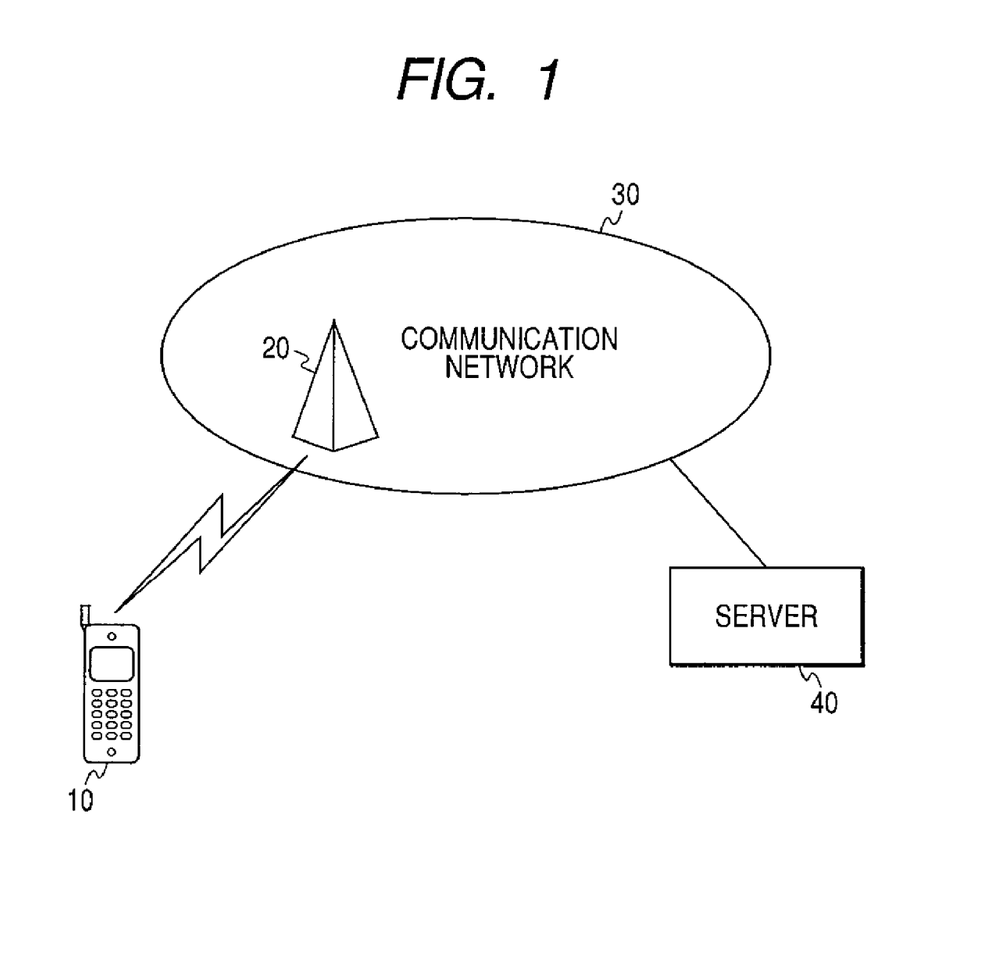
FIG. 1 is diagram illustrating the configuration of an embodiment of a radio communication system to which a mobile phone serving as a communication terminal according to the invention is applied.

FIG. 1 is block diagram illustrating the configuration of an embodiment of a mobile phone serving as a communication terminal according to the invention is applied.

As shown in FIG. 1, a mobile phone 10 according to the present embodiment has a function of transmitting a request for sending any desired data to a server 40 from a radio communication portion via a base station 20 through a communication network (network) 30, and displaying Web data corresponding to the request in a display portion. Incidentally, the network 30 includes the aforementioned PDSN (not shown).

The mobile phone 10 according to the present embodiment has radio communication functions that conform to a first communication system (CDMA2000 1xEV-Do communication system (hereunder referred to simply as EVDO communication system)) adapted to establish a communication session (air session) by sending parameters (for example, values of the DRC, the values of the power, the information specifying a sector in the base station used for communications, and the information specifying the time slot used for a communication to the network, and also adapted to keep the communication session established, regardless of the presence/absence of the information to be communicated, so that data communications can instantly be performed. The mobile phone 10 also has radio communication functions that conform to a second communication system (CDMA2000 1x communication system (hereunder referred to simply as 1x communication system)) adapted to share a part of a transmitting/receiving portion with the EVDO communication system serving as the first communication system and to enable the establishment of a communication session when the physical session (air connection) is established.

Also, the mobile phone 10 has the following function. That is, when a data link (PPP session) comes to be released while the mobile phone 10 performs a radio communication according to the EVDO communication system serving as the first communication system, the mobile phone 10 does not release the communication session in a case where the release of the data link is performed according to the process of turning off the power supply.

Also, the mobile phone 10 has the function of performing a reconnection process (reestablishment process) of the communication session in a case where the communication session is released according to any process other than the power-supply-off process (for example, communication termination is instructed in response to data communication termination).

That is, in the present embodiment, the mobile phone 10 is configured as a radio communication terminal enabled to be connected to the radio networks (communication networks) of the following two types of communication systems:

(1) A network of the 1x communication system (including IS95 system) to be normally connected; and (2) A network of the EVDO communication system adapted so that the communication speed thereof is higher than that of the radio network (1) to be normally connected, and that the service area thereof is narrow.

According to the EVDO communication system, the base station 20 changes a method of modulating data transmitted to the radio communication terminal based on information which represents the reception condition and is received from the radio communication terminal. Thus, when the reception condition of the terminal is good, a high communication rate can be used while error tolerance is low. In contrast, when the reception condition of the terminal is poor, a low communication rate can be used while the error tolerance is high.

In the downstream direction of the EVDO communication system (from the base station to a radio communication terminal), the time division multiple access (TDMA) is employed so that time is divided in units of (1/600) seconds and into times slots, in each of which the base station performs a communication only with one communication terminal, and that the base station changes the communication terminal to be communicated therewith according to the time to thereby communicate with a plurality of communication terminals. Thus, data transmission to each of the communication terminals can always be performed with the maximum power, so that the data communication between the communication terminals can be performed at the highest communication speed.

Meanwhile, it is assumed that a communication terminal employing the EVDO communication system is used under a strong electric field. An antenna gain is not regarded as important.

Additionally, to enhance reception performance, it is preferable that diversity communications are performed using a plurality of antennas 111 and 112 and receiving circuits 114 and 115 to obtain good performance even in a fading environment. Although the mobile station can be configured using only one receiving circuit, better performance can be obtained by providing two or more receiving circuits therein.

More specifically, the communication terminal employing the EVDO communication system is configured so that an RF front end portion is constituted by including a combination of a transmitting circuit 116 and a receiving circuit 114 and an antenna changeover switch 113, which correspond to a main antenna, and a receive only circuit 115 corresponding to a subantenna.

Signals obtained from a plurality of receiving circuits are combined with one another according to a maximum ratio combination method or a minimum mean squared error method to thereby compensate for degradation of the reception performance in a fading environment.

Generally, it is known that the influence of interference in a case, in which two antennas are used (diversity is performed), is extremely small, as compared with that of interference in a case, in which one antenna is used (diversity is not performed).

In contrast, the communication terminal used according to the 1x communication system includes one receiving circuit 114. Additionally, the antenna of this communication terminal includes one main antenna 111.

In the present embodiment, the mobile phone 10 serves as a phone having a preferred transmitting/receiving function, which conforms to a plurality of radio communication systems, and is configured as follows.

Figure 2:
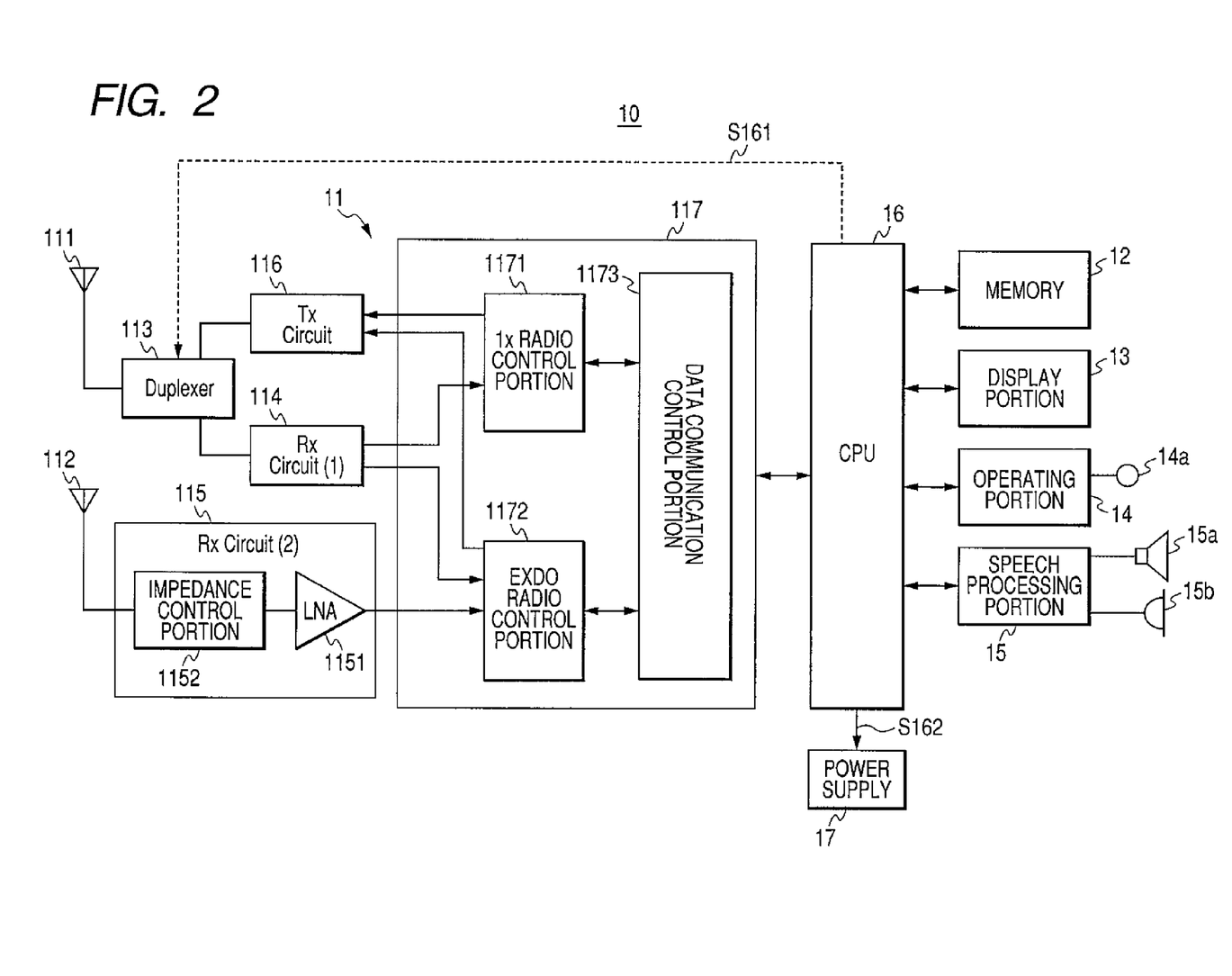
FIG. 2 is block diagram illustrating the configuration of an embodiment of a mobile phone serving as a communication terminal according to the invention is applied.

FIG. 2 is block diagram illustrating the configuration of an embodiment of the mobile phone 10 serving as a communication terminal according to the invention is applied.

That is, as shown in FIG. 2, the mobile phone 10 according to the present embodiment has a main antenna 111, a subantenna 112, and receiving circuits 114, 115, and 117 and can perform communications by selectively employing the second communication system (CDMA2000 1x communication system (hereunder referred to simply as the 1x communication system)), according to which no diversity is performed, and the first communication system (CDMA2000 1xEVDO communication system (hereunder referred to simply as the EVDO communication system)) adapted to perform diversity. Also, the mobile phone 10 has a function of receiving signals of frequency bands in which the frequency bands respectively corresponding to the 1x communication system and the EVDO communication system are close to each other.

Incidentally, as shown in FIG. 2, a part of the receiving circuitry, whose typical components are the main antenna 111, the changeover switch 113, the first receiving circuit 114, and the transmitting circuit 116 shown in FIG. 2, is shared by the EVDO communication system serving as the first communication system and the 1x communication system serving as the second communication system.

When the mobile phone 10 performs a communication according to the 1x communication system, the receiving circuitry performs a communication using only the main antenna 111. When the mobile phone 10 performs a communication according to the EVDO communication system, the receiving circuitry combines signals respectively received through the main antenna 111 and the subantenna 112. Only when the subantenna 112 is used, a first impedance (for example, 50 ohms) matched in the frequency band used in performing communications according to the EVDO communication system is provided for the subantenna 112.

When the mobile phone 10 performs a communication according to the 1x communication system, the receiving circuitry changes the impedance to a different value from the first impedance. For example, the input impedance is opened or shorted to thereby cause a transition of the frequency, which can be covered by the subantenna 112, to a frequency different from that of the main antenna.

Meanwhile, as shown in FIG. 2, the mobile phone 10 according to the present embodiment has a radio communication portion 11, a memory 12 serving as a storage portion, a display portion 13, an operating portion 14 including a power key 14*a*, a speech processing portion 15 including a speaker 15*a* and a microphone 15*b*, a user interface (I/F) control portion (hereunder referred to simply as a control portion) 16, and a power supply portion 17.

To perform a radio communication using radio waves, the radio communication portion 11 modulates various kinds of information, such as image data, voice information, and e-mails, which are processed by the control portion 16, at the transmitting/receiving portion, and transmits the information through a transmitting/receiving antenna to the communication network 30 including the base station 20.

The radio communication portion 11 receives image data, voice information, and e-mails, which are transmitted from the server 40 through the communication network 30, and the base station 20 by the transmitting/receiving antenna. Subsequently, the radio communication portion 11 demodulates the received various information, and outputs the information to the control portion 16.

Also, according to the 1x communication system, when data to be transferred from either side of the communication terminal and the network is caused in a state in which the power supply is turned on, the radio communication portion 11 first establishes a physical connection. Subsequently, the radio communication portion 11 establishes a data link under the control of the control portion 16. Then, data communications are performed.

In this case, a communication session or the like is not held. Thus, while the power supply is turned on, the radio communication portion 11 establishes a communication session when the physical connection is established (when a communication is started). When the physical connection is disconnected, the radio communication portion 11 performs only the process of releasing the data link.

Also, in a case where the power key 14*a* of the operating portion 14 is operated to thereby make a power-supply-off request, the radio communication portion 11 first releases the data link and subsequently releases the physical connection in response to the request from the control portion 16.

Also, according to the EVDO communication system, the radio communication portion 11 performs the establishment and the release of a data link, the establishment and the release of a communication session, and the establishment and the release of a physical connection under the control of the control portion 16.

In this case, the radio communication portion 11 sends parameters used for communications to the network, and stores at least a part of the parameters in the memory 12 so that the stored parameters can be used at the subsequent data communication. Thus, the radio communication portion 11 establishes a communication session, and holds the communication session in an established state, regardless of the presence/absence of the information to be communicated, so that a data communication can instantly be performed.

According to the EVDO communication system, while the power supply is turned on, the radio communication portion 11 is adapted to always hold the communication session. Thus, immediately after releasing the communication session, the radio communication portion 11 holds the communication session by performing reconnection process.

In this case, when the communication session is released by, for example, terminating data communication, the radio communication portion 11 determines whether the communication session is released according to any factor other than the power-supply-off command. In a case where the radio communication portion 11 determines that the communication session is released according to any factor other than the power-supply-off command, the radio communication portion 11 does not perform the release of the communication session.

In a case where the power key 14*a* of the operating portion 14 is operated to thereby make a power-supply-off request, the radio communication portion 11 performs the release of the data link in response to the request from the control portion 14. Subsequently, the radio communication portion 11 performs the disconnection process of the physical connection. However, the radio communication portion 11 does not release the communication session. The radio communication portion 11 maintains the communication session without performing the reconnection process of the communication session.

For example, as shown in FIG. 2, the radio communication portion 11 has the main antenna 111, the subantenna 112, the changeover switch 113, the first receiving circuit 114, the second receiving circuit 115, the transmitting circuit 116, and the base band portion 117.

The changeover switch 113 switches the connection of the main antenna 111 between the first receiving circuit 114 and the transmitting circuit 116 according to a switch control signal S161 of the control portion 16.

The first receiving circuit 114 includes a low-noise amplifier (LNA) or a shared device, and a demodulator. The first receiving circuit 114 demodulates a pilot signal, which conforms to the 1x or EVDO communication system and is received from the main antenna 111 through the base station 20 and the changeover switch 113, into a multiplexed signal from a received signal in the baseband according to a demodulation method corresponding to a modulation method applied to the signal received from the base station 20. Incidentally, the present embodiment performs demodulation according to one of the three types of demodulation methods, for example, QPSK (Quadric Phase Shift Keying), 8PSK (8 Phase Shift Keying), and 16QAM (16 Quadric Phase Amplitude Modulation) methods.

The first receiving circuit 114 outputs the demodulated signal to the base band portion 117.

The second receiving circuit 115 basically demodulates a pilot signal, which conforms to the EVDO communication system and is received through the subantenna 112, into a multiplexed signal from a received signal in the baseband according to the demodulation system corresponding to the modulation method applied to the signal received from the base station 20. Incidentally, the present embodiment performs demodulation according to one of the three types of the demodulation methods, for example, QPSK, 8PSK, and 16QAM methods.

The second receiving circuit 115 outputs the demodulated signal to the base band portion 117.

The second receiving circuit 115 sets the input impedance at 50Ω to thereby match the covered frequencies of the subantenna 112 with the reception band according to the EVDO communication system.

The second receiving circuit 115 has an input impedance shifted in an open or short direction to thereby cause a transition of the covered frequencies of the subantenna 112 to a frequency band different from that of the main antenna 111 according to the 1x communication system.

With this configuration, the tolerance in a fading environment can be enhanced according to a diversity system. Thus, the improvement of the reception performance can be achieved according to the EVDO communication system, that is, in an EVDO mode. Also, according to the 1x communication system, that is, in the 1x mode, the subantenna 112 connected to the second receiving circuit 115 can be prevented from having an adverse effect, such as interference, on the main antenna 111.

The second receiving circuit 115 includes an LNA 1151 and an impedance control portion 1152 disposed at a preceding stage of the LNA 1151, and alleviates interference in the 1x mode by using the impedance control portion 1152.

In the present embodiment, to alleviate the interference in the 1x mode, the input impedance of the LNA 1151 in the second receiving circuit 115 is shifted from 50Ω.

The transmission circuit 116 transmits information to be transmitted through the changeover switch 113, which is supplied by the base band portion 117, through the main antenna 111 to the communication network 30 that includes the base station 20.

According to the 1x communication system, the base band portion 117 controls the establishment and the release of the physical connection and the establishment and the release of the data link through the first receiving circuit 114 and the transmitting circuit 116 under the control of the control portion 16.

According to the EVDO communication system, the base band portion 117 controls the establishment and the release of the physical connection, the establishment and the release of the communication session, and the establishment and the release of the data link through the first receiving circuit 114, the second receiving circuit 115, and the transmitting circuit 116 under the control of the control portion 16.

As shown in FIG. 2, the base band portion 117 includes a 1x radio control portion 1171, an EVDO radio control portion 1172, and a data communication control portion 1173 as primary components.

The 1x radio control portion 1171 controls mainly the establishment and the release of the physical connection through the first receiving circuit 114 and the transmitting circuit 116 in the case of employing the 1x communication system, that is, in the 1x communication mode.

When a physical connection release request is received by the data communication control portion 1173 in the 1x communication mode, the 1x radio control portion 1171 releases the physical connection held in an established state. In a state in which the power supply is turned on in the 1x communication mode, the 1x radio control portion 1171 establishes a physical connection when a communication is started. Then, the 1x radio control portion 1171 establishes a data link. When the data link is released, the 1x radio control portion 1171 also releases the physical connection.

When the power-supply-off is instructed by the operating portion 14, the 1x radio control portion 1171 receives a power-supply-off command issued from the control portion 16 after the physical connection is released.

The EVDO radio control portion 1172 controls the establishment and the release of a communication session and the establishment and the release of physical connection through the first receiving circuit 114 and the second receiving circuit 115 and the transmitting circuit 116 in the case of employing the EVDO communication system, that is, in the EVDO communication mode.

When a communication session release request is received by the data communication control portion 1173 in the EVDO communication mode, the EVDO radio control portion 1172 inquires of the data communication control portion 1173 whether the release of communication session is based on a power-supply-off command (for example, inquires whether a power-supply-off flag is set). If the release of communication session is based on the power-supply-off command, the EVDO radio control portion 1172 maintains the communication session without performing the reconnection of the communication session.

In a case where the release of the communication session is not based on the power-supply-off command, the EVDO radio control portion 1172 performs the release of the communication session. Subsequently, the EVDO radio control portion 1172 again performs the establishment (reestablishment) of the communication session.

Also, when the power supply is turned off, the EVDO radio control portion 1172 receives a power-supply-off command from the control portion 16 while maintaining the communication session.

The data communication control portion 1173 controls mainly the establishment and the release of a data link in the 1x communication mode and the EVDO communication mode.

When receiving a data session disconnection request from the control portion 16 in the 1x communication mode regardless of whether a power-supply-off indicator is added, the data communication control portion 1173 releases the data link and issues a connection release request to the 1x radio control portion 1171 in the data link released state. Also, when receiving a data session disconnection request (for example, a data communication termination instruction from the operating portion 14), to which no power-supply-off indicator is added, from the control portion 16 in the EVDO communication mode, the data communication control portion 1173 releases the data link without setting the power-supply-off flag and issues a connection release request to the EVDO radio control portion 1172 in the data link released state.

When receiving a data session disconnection request (for example, a power-supply-off instruction from the operating portion 14 during the data communication), to which a power-supply-off indicator is added, from the control portion 16 in the EVDO communication mode, the data communication control portion 1173 sets the power-supply-off flag, releases the data link, and issues a connection release request to the EVDO radio control portion 1172 in the data link released state.

When receiving an inquiry about the set state of the power-supply-off flag from the EVDO radio control portion 1172, the data communication control portion 1173 informs the EVDO radio control portion 1172 whether the power-supply-off flag is set.

According to the EVDO communication system, the base band portion 117 performs the following operation under the control of the EVDO radio control portion 1172 and the data communication control portion 1173.

The base band portion 117 receives reception data demodulated in the first receiving circuit 114 and the second receiving circuit 115. Then, the base band portion 117 performs decoding by using a decoder (not shown), more specifically performs inverse spread spectrum processing on reception multiplexed signal having undergone spectrum spread processing. The base band portion 117 combines the signals supplied from the first receiving circuit 114 and the second receiving circuit 115 according to the maximum ratio combination method or the minimum mean squared error method to thereby compensate for degradation of the reception performance in the fading environment.

Incidentally, in a case where reception data allocated to an own station (for example, a speech signal from an associated party, and data to be downloaded) is present, the reception data is outputted from the decoder to the control portion 16.

Further, in the decoding process, the decoder obtains $E_c/I_o$ (the ratio of the pilot signal strength to the total received signal strength) and calculates a value of CIR (the carrier-to-interference ratio) according to the following equation (1).

(Equation 1)

$$CIR = (E_c/I_o)/(1 - E_c/I_o) \quad (1)$$

The value of CIR obtained according to this equation is outputted from the decoder to a predictor (not shown), which predicts the value of CIR at the next receiving slot timing (incidentally, one slot is 1.66 ms=(1/600) seconds).

A prediction method is not limited to a specific method. An example of the prediction method is a linear prediction method. Information indicating the number of time slots counted from a current time slot to a later time slot, at which the predictor needs to predict the CIR, is included in various control signals transmitted from the base station 20 when the power supply for the mobile phone 10 is on. The predicted CIR obtained by the predictor is supplied to a CIR-DRC conversion portion (not shown).

The CIR-DRC conversion portion converts the value of the predicted CIR into that of the DRC according to a CIR-DRC conversion table (not shown). The DRC (Data Rate Control Bit) is the maximum communication speed, at which data can be received by the mobile phone 10 at a predetermined error rate or less, and is estimated from the predicted CIR. The DRC corresponding to the reference CIR is defined in the CIR-DRC conversion table. In a case where the input predicted CIR is the reference CIR, the CIR-DRC conversion portion outputs the DRC corresponding to the CIR to the control portion 16.

Meanwhile, in a case where the predicted CIR inputted from the predictor is not the reference CIR, the DRC corresponding to the reference CIR, which is closest to the input predicted CIR, is obtained. Alternatively, interpolation is performed on two CIR values closest to the input predicted CIR, so that the DRC corresponding to the interpolated CIR is obtained. Thus, the DRC corresponding to each of the predicted values of CIR can be obtained. Consequently, it is possible to inform a user of a more accurate reception condition.

The base band portion 117 multiplexes the DRC and transmission data outputted from the control portion 16 by using a multiplexer. Then, the base band portion 117 encodes resultant data by using an encoder and then outputs to the transmitting circuit 116.

According to the 1x communication system, the base band portion 117 performs the following operation under the control of the 1x radio control portion 1171 and the data communication control portion 1173.

The base band portion 117 receives reception data demodulated in the first receiving circuit 114 and performs decoding by using the decoder (not shown). More specifically, the base band portion 117 performs inverse spread spectrum processing on the reception multiplexed signal having undergone the spectrum spread processing. Consequently, physical connection is established.

Incidentally, in the case of the 1x communication, a data link is established. Also, in a case where the reception data allocated to the own station (for example, a speech signal from the associated party, and data to be downloaded) is present, the reception data is outputted from the data communication control portion 1173 and the decoder to the control portion 16.

Further, in the decoding process, the decoder obtains $E_c/I_o$ (the ratio of the pilot signal strength to the total received signal strength) and calculates a value of CIR (the carrier-to-interference ratio) according to the aforementioned equation (1). Subsequently, the calculated value is outputted to the control portion 16.

The base band portion 117 encodes the transmission data outputted from the control portion 16 by using an encoder. Then, according to the mode, the resultant code is multiplexed at the 1x radio control portion 1171 or the EVDO radio control portion 1172. Subsequently, the multiplexed data is outputted to the transmitting circuit 116.

The memory 12 includes a nonvolatile memory, such as EEPROM, and preliminarily stores a desired communication speed corresponding to each of the communication systems, for example, a speed display table. Also, the memory 12 stores data representing the frequency, the PN code, and the channel used at the establishment of the physical connection, the parameters used at the establishment of the communication session, and the decoded data used at the establishment of the data link.

The display portion 13 has a display device, such as a liquid crystal display (LCD) or an electroluminescence (EL) display. The display portion 13 displays, for instance, the telephone number entered for performing the speech function, various messages, text data, and radio wave conditions according to the CIR under the control of the control portion 16. When the power supply is turned off, the display portion 13 receives a power-supply-off command from the control portion 16 and displays a power-supply-off indication.

The operating portion 14 has a plurality of keys, such as a termination (ring-off)/power key, a start (calling-request) key, a direction key indicating the movement of a cursor, a plurality of numeric keys corresponding to numerals. When these keys are operated, the operating portion 14 supplies input information from a user to the control portion 16.

The speech processing portion 15 has a speech processing circuit to which a speaker 15a for outputting voices to perform a speech function and a microphone 15b for inputting voices are connected. The speech processing portion 15 performs predetermined processing on voice data collected through the microphone 15b during a call. Then, the speech processing portion 15 outputs results to the control portion 16. The speech processing portion 15 performs predetermined processing corresponding to voice information supplied by the control portion 16 and causes the speaker 15a to radiate sounds.

The control portion 16 is constituted mainly by a microcomputer and controls the entire mobile phone 10. For example, the control portion 16 controls radio transfer of various kinds of information by the radio communication portion 11. The control portion 16 processes voice information for the speech processing portion 15. The control portion 16 controls the display of information in the display portion. The control portion 16 also controls change in the cursor display form. The control portion 16 performs a cursor on/off control operation. The control portion 16 also controls various lighting operations. The control portion 16 performs processing according to input information through the operating portion 14. The control portion 16 performs an access control operation on the memory 12.

The control portion 16 can determine in which of the 1x communication system and the EVDO communication mode the radio communication portion 11 performs radio communications. However, in a standby state before the start of a communication, the control portion 16 causes the display portion 13 to display a standard screen (what is called a standby screen) in the display portion 13 just after the power is turned on. In a state in which the standby screen is displayed, a calling request, and a data communication start operation can be performed by operating the operating portion 14.

When a data communication is terminated during the data communication, the control portion 16 outputs a data session disconnection request to the data communication control portion 1173. Incidentally, when the control portion 16 recognizes that the power should be turned off because a user operates the power key 14a of the operating portion 14 while the power supply is turned on, the control portion 16 outputs a data session disconnection request, to which a power-supply-off indicator is added, to the data communication control portion 1173 of the base band portion 117.

At a moment at which the power supply is turned off, the control portion 16 sends a power-on command to the 1x radio control portion 1171 or the EVDO radio control portion 1172. Also, the control portion 16 sends a power-supply-off command to the display portion 13 to thereby cause the display portion 13 to display a power-supply-off indication. Subsequently, the control portion 16 sends a control signal S162 to the power supply 17 to thereby turn off the power supply.

Also, when the EVDO communication mode is started, or when the terminal is in the EVDO communication mode, the control portion 16 acquires necessary parameters as a part of the process of establishing the communication session. An example of such parameters is the DRC. When a DRC is inputted from the base band portion 117 of the radio communication portion 11, the control portion 16 determines whether transmission data generated in the mobile phone 10 is present. In a case where such transmission data is present, the control portion 16 outputs the transmission data together with the DRC to the base band portion 117. Meanwhile, in a case where such transmission data is not present, the control portion 16 outputs the DRC inputted from the CIR-DRC conversion portion to the base band portion 117 as a part of the parameters for the communication session.

Incidentally, the DRC and the transmission data outputted from the control portion 16 are transmitted through the radio communication portion 11 to the base station 20 and are managed at the network as values used to know the conditions of communications therebetween. Also, the network informs the base band portion 117 and the control portion 16 of data indicating a reception condition corresponding to the highest traffic efficiency, through the radio communication portion 11. The data indicating such a reception condition is also stored in the memory 12 as the parameter for the communication session. More specifically, according to the EVDO communication system, the base station 20 or the PDSN of the network determines the portable communication terminal, to which data is transmitted by using the next slot, and the communication speed (modulation speed), at which the data is transmitted, according to the DRC received from the mobile phone 10 are informed. Then, the determined portable communication terminal and the determined communication speed In the 1x communication system, the data communication speed in the direction from the base station 20 to the mobile phone 10 as radio communication terminal can also be determined based on the instantaneous value of the CIR (carrier to interference ratio) indicating the reception state in the portable communication terminal. That is, according to CDMA, which is presently widely available communication system, differently from the EVDO communication system, change in the data communication speed depending on the location is not so noticeable. Thus, the necessity for informing the user of the reception condition instantly is low. The reception condition is also determined according to the instantaneous values of $E_c/I_o$ (pilot signal strength to total reception signal strength), and CIR, found from the pilot signal received from the base station 20 and the downlink communication speed is determined. Such calculation is performed at the base band portion 117 and the control portion 16.

As described above, according to the EVDO communication system, the control portion 16 estimates and determines the down-link data communication speed according to the reception condition of the signal received from the base station 20. The EVDO communication system has the characteristic that the data communication speed in the direction from the base station 20 to the mobile phone 10 serving as the radio communication terminal largely changes according to the reception condition in the mobile phone 10 (for example, the reception electric field strength, the carrier-to-interference ratio=CIR).

For example, in a case where the mobile phone 10 is in the best reception condition, data communications can be performed at a communication speed of 2.4 Mbps. When the reception condition is poor, the data communication speed is lowered to about several 10 kbps. That is, according to the EVDO communication system, differently from the 1x communication system, the down-link data communication speed is not simply determined according to the instantaneous value of the CIR (carrier-to-interference ratio) indicating the reception condition and changes according to, for example, prediction, and correction using statistical data that represents the error rate of down-link data transmission in the past. Thus, according to the EVDO communication system, change in the data communication speed depending upon a location is noticeable, as described above. Therefore, it is necessary to instantly inform a user of the extremely accurate data communication speed.

Thus, in the present embodiment, the user is informed of the DRC directly indicating the extremely accurate data communication speed obtained in consideration of prediction, correction using the statistical data of the error rate of down-link data transmission in the past, so that the user can know the accurate data communication speed, and that at the time of starting the data communication, the user can easily obtain the location suitable for the data communication and can start a data communication in an environment suitable for the communication. Because the aforementioned DRC is a value derived from the predicted CIR, the derived DRC is also a future value (a value at a moment that is, for example, (1/600) seconds in advance).

Meanwhile, an operation of the circuit shown in FIG. 2 is described with reference to FIGS. 3 and 4 by centering on the release of a data link and a communication session when the power supply is turned off.

Figure 3:
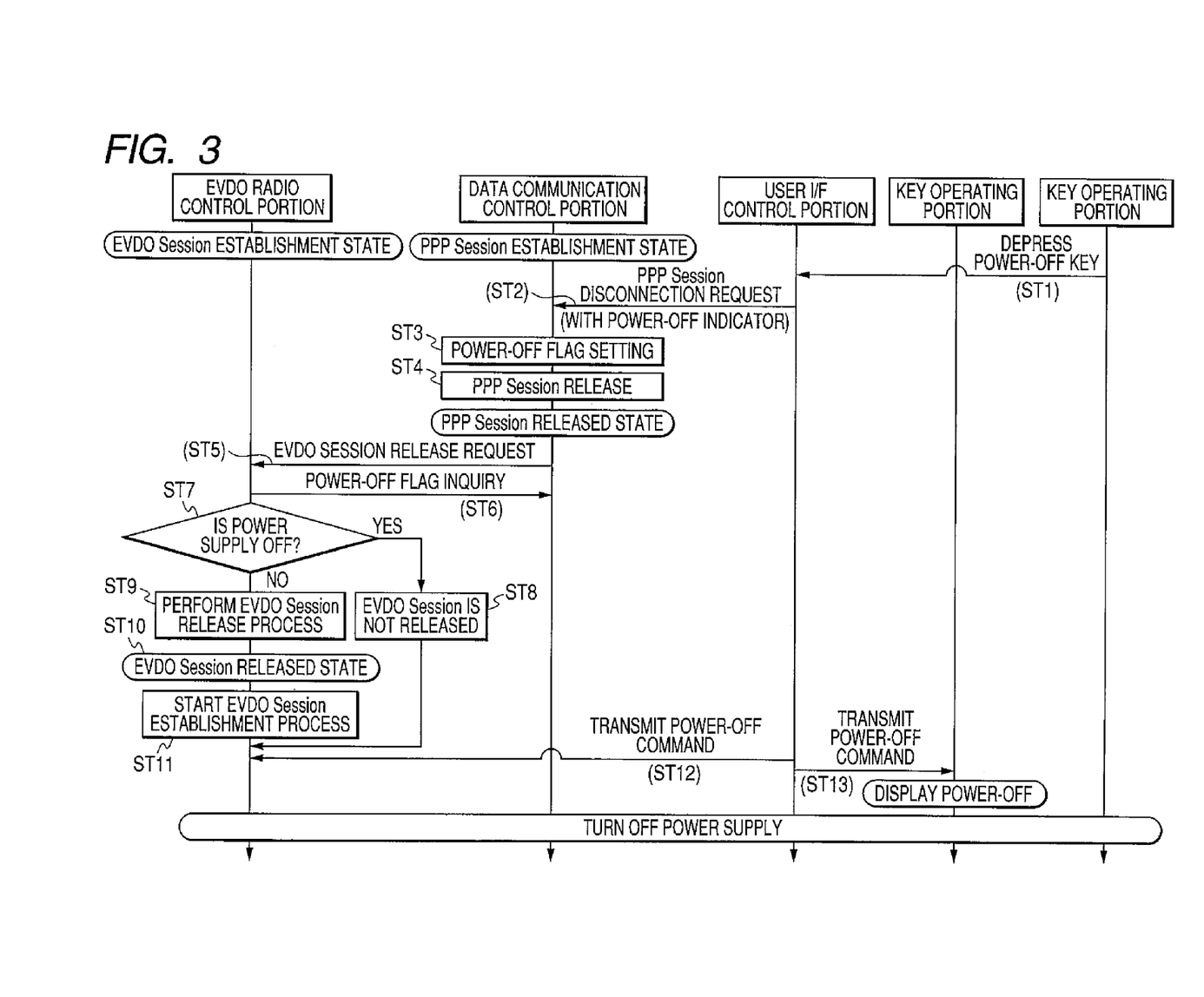
FIG. 3 is a diagram illustrating a process of releasing a data link and a communication session when a power supply is turned off in an EVDO communication mode.

FIG. 3 is a diagram illustrating the release of a data link and a communication session when the power supply is turned off in the EVDO communication mode. FIG. 4 is a diagram illustrating the release of a data link and a communication session when the power supply is turned off in the 1x communication mode.

In the following description, it is assumed that during the data communication in the EVDO communication mode, physical connection is controlled by the base band portion 117, that additionally, a communication session is controlled by the EVDO radio control portion 1172 in an established state, and that a data link is controlled to the establishment state by the data communication control portion 1173 in an established state. It is also assumed that during a data communication in the 1x communication mode, physical connection is controlled by the base band control portion 117, and that additionally, a data link is controlled by the data communication control portion 1173 in an established state.

In the EVDO communication mode, in the radio communication portion 11, the first receiving circuit 114, the second receiving circuit 115, and the transmitting circuit 116 are put into an operating state. Further, the second receiving circuit 115 has the input impedance held by the impedance control portion 1152 at 50 ohms that is also a value of the input impedance of the LNA 1151. Consequently, a diversity system is adapted so that the interference between the antennas is low. The reception data received by the main antenna 111 and the subantenna 112 is used.

In the first receiving circuit 114, the pilot signal, which conforms to the EVDO communication system and is received from the base station 20 through the changeover switch 113 and is also received at the main antenna 111, is demodulated into a multiplexed signal from the reception signal in the baseband according to the demodulation system corresponding to the modulation method applied to the reception signal from the base station 20. The multiplexed signal is outputted to the base band portion 117.

In the second reception circuit 115, the pilot signal, which conforms to the EVDO communication system and is received at the subantenna 112, is demodulated into a multiplexed signal from the reception signal in the baseband according to the demodulation method corresponding to the modulation method applied to the reception signal from the base station 20. The multiplexed signal is outputted to the base band portion 117.

Next, an operation of turning off, during the data communication, the power supply is described below by referring to FIG. 3. As shown in FIG. 3, when the power key 14a of the operating portion 14 is operated in the EVDO communication mode (ST1), the control portion 16 recognizes that the power should be turned off. Then, the control portion 16 outputs a data session disconnection request, to which a power-supply-off indicator is added, to the data communication control portion 1173 of the base band portion 117 (ST2).

When receiving the data session disconnection request, the data communication control portion 1173 sets the power-supply-off flag (ST3) and performs the release of the data link (ST4).

Then, in the data link released state, the data communication control portion 1173 outputs an EVDO communication session release request to the EVDO radio control section 1172 (ST5).

The EVDO radio control portion 1172 inquires of the data communication control portion 1173 whether the power-supply-off flag is set, so as to determine whether the release of the communication session is based on a power-supply-off command (ST6 and ST7). In a case where the release of the communication session is based on the power-supply-off command, the EVDO radio control portion 1172 does not release the communication session (ST8).

Meanwhile, in a case where the release of the communication session is not based on the power-supply-off command, the EVDO radio control portion 1172 releases the EVDO communication session (ST9 and ST10). Upon completion of the release, the EVDO radio control portion 1172 starts the reconnection of the communication session (ST11).

Then, when a predetermined time elapses since a data link release request is sent to the data communication control portion 1173 (a timer having a predetermined time needed for the release of a data link expires), the control portion 16 determines that a moment, at which the power supply is turned off, has arrived. Subsequently, the control portion 16 sends a power-supply-off command to the base band portion 117 including the 1x radio control portion 1171 and the EVDO radio control portion 1172 (ST12).

Also, the control portion 16 sends a power-supply-off-command to the display portion 13 to thereby cause the display portion 13 to display a power-supply-off indication (ST13). Subsequently, the control portion 13 outputs a control signal S162 to the power supply 17 and causes the power supply 17 to stop the supply of electric power to each block. Also, the control portion 13 itself enters a sleep mode.

Incidentally, the network 30 basically holds the parameters for the communication session until the mobile phone 10 having performed a communication with the base station 20 issues a communication session release request. In a case where no EVDO communication session between the mobile phone 10 and the network 30 is not caused for a predetermined time, minute communications therebetween are intermittently performed to thereby locate the mobile phone 10. In a case where no response is obtained for a while, it is determined that the mobile phone 10 is not in a communicable state. Thus, the parameters for the communication session are discarded. Incidentally, in a case where a communication session release request is made, the parameters are discarded or updated. Thus, when a reconnection request is made, the mobile phone 10 is notified of new parameters.

The mobile phone 10 continues to monitor the interruption caused by the power-on key 14a of the operating portion 14 after the control portion 16 is brought into the sleep mode by turning off the power supply. When power-on is instructed by using the power-on key 14a, the power supply 17 is caused to start the supply of electric power to each block. Also, the activation of the base band portion 117 is instructed. First, physical connection is established. Subsequently, an EVDO communication session is established. Then, it is checked through the base station whether the parameters for the communication session at the last power-supply-off are left in the network. In a case where the parameters are left (this can frequently occur in a case where a time from the last power-supply-off to the subsequent power-supply-off is short and where the moved distance of the mobile phone is minute), the parameters are acquired, so that the parameters stored in the memory 12 are updated. Alternatively, the reestablishment of the communication session is performed by using the parameters that are stored in the memory 12 before the last power-supply-off, and that are left in the memory 12.

Thus, in the EVDO communication mode, when the power supply is turned off, the communication session is maintained without being released. Accordingly, although the power supply is turned off, the interruption of the protocol sequence of the reestablishment is wastefully caused. Thus, the network is not adversely affected. The reestablishment of a communication session at the power-supply-off is omitted. Consequently, time required to turn off the power supply is reduced. Also, in a case where the power supply is thereafter turned on, it is not necessary to perform several processes, such as the recalculation of parameters, again. Thus, the reestablishment of a communication session can quickly be achieved. Also, a burden imposed on the network can be reduced as much as possible.

Further, in the 1x communication mode, the first receiving circuit 114 and the transmitting circuit 116 are put into an operating condition in the radio communication portion 11, while the second receiving circuit 115 is put into a non-operating condition.

Also, in the second receiving circuit 115, the input impedance is controlled by an impedance control portion 1152 to be shifted from the input impedance of the LNA 1151, whose value is 50 ohms.

In the first receiving circuit 114, a pilot signal which is received by the main antenna 111 and is supplied from the base station 20 through the changeover switch 113 and conforms to the 1x communication system, is demodulated into a multiplexed signal of the baseband according to the demodulation method corresponding to the modulation method applied to the reception signal received from the base station 20. Then, the demodulated signal is outputted to the base band portion 117.

According to the 1x communication system, the reception data, which is demodulated at the first receiving circuit 114, is inputted to the base band portion 117. Then, the inverse spread spectrum processing is performed on the received multiplexed signal having undergone the spread spectrum processing. In a case where the reception data (for example, a speech signal from an associated party, and data to be downloaded) allotted to the own station is present, the reception data is outputted from the decoder to the control portion 16.

Also, the base band portion 117 further encodes the transmission data, which is outputted from the control portion 16, by using the encoder. Then, the base band portion 117 outputs the encoded data to the transmitting circuit 116.

Figure 4:
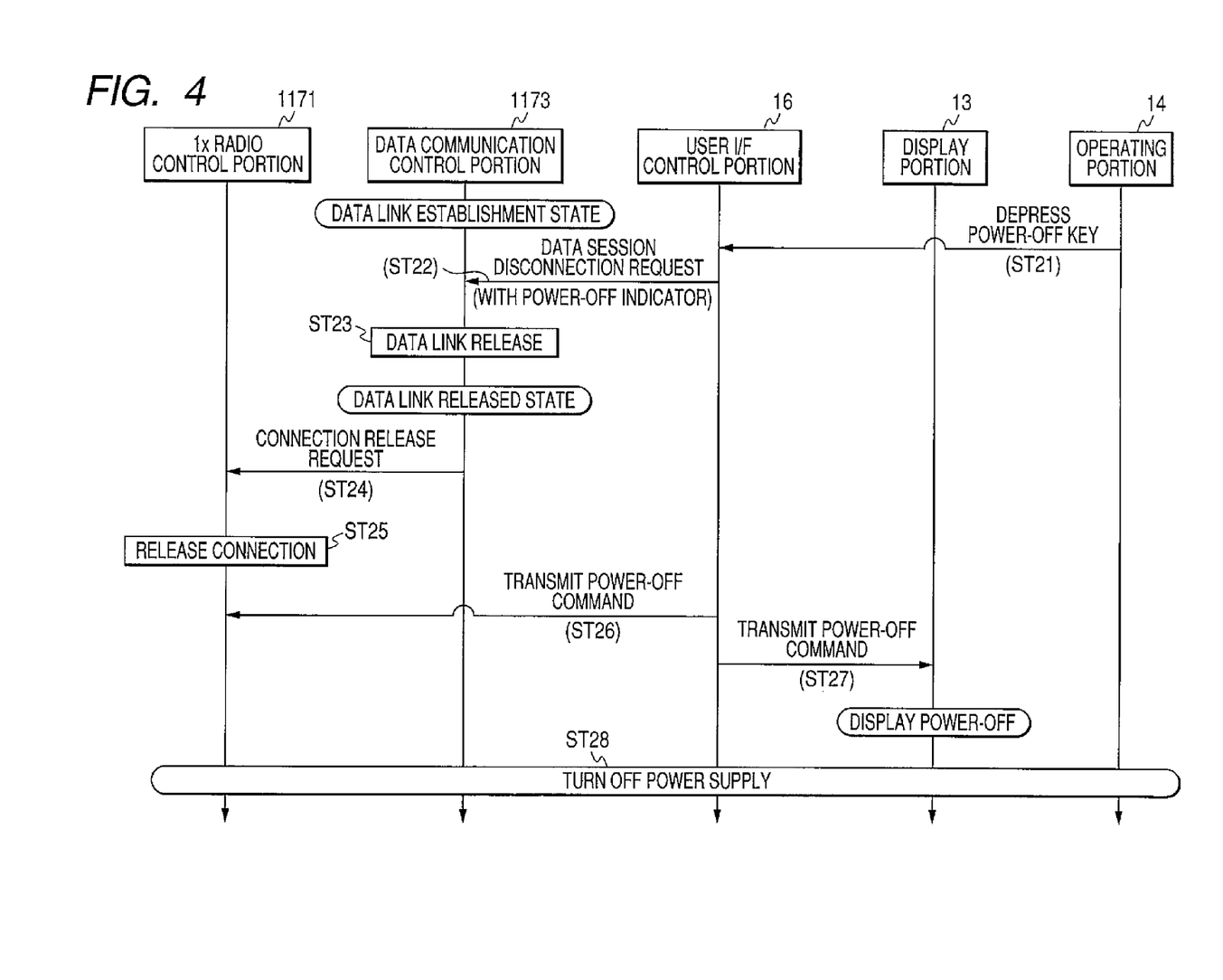
FIG. 4 is a diagram illustrating a process of releasing a data link and a connection when a power supply is turned off in a 1x communication mode.

As shown in FIG. 4, when the power key 14a of the operating portion 14 is operated (ST21) during a data communication is performed in the 1x communication mode, the control portion 16 recognizes that the power supply should be turned off when the power key 14a of the operating portion 14 is operated during the power supply is turned on. Then, the control portion 16 outputs a data session disconnection request, to which the power-supply-off indicator is added, to the data communication control portion 1173 (ST22). The data communication control portion 1173 receives the data session disconnection request and releases the data link (ST23).

Also, the data communication control portion 1173 outputs a 1x communication connection release request to the 1x radio control portion 1171 in a data link released state (ST24).

The 1x radio control portion 1171 releases the connection in response to the connection release request (ST25).

Also, at the arrival of the moment at which the power supply is turned off, the control portion 16 sends a power-supply-off command to the 1x radio control portion 1171 or the data communication control portion 1173 (ST26).

Additionally, the control portion 16 sends a power-supply-off command to the display portion 13 to thereby cause the display potion 13 to display a power-supply-off indication (ST27). Subsequently, the control portion 16 outputs a control signal S162 to the power supply 17 to thereby cause the power supply 17 to stop the supply of electric power to each block (ST28). Then, the control portion itself 16 enters a sleep mode.

As described above, according to the present embodiment, the communication terminal employing the EVDO communication system is adapted so that parameters used for communications are sent to the network to thereby establish a communication session, and that a state, in which the communication session is established, is maintained regardless of the presence/absence of information to be communicated, to instantly perform a data communication. Further, this communication terminal is configured to have both the EVDO radio control portion 1172, which is adapted to perform a radio communication control operation according to the EVDO communication system, and also have the base band portion 117 adapted to release, when the turning-off of the power supply is instructed at the establishment of a data link, the data link without releasing a communication session. Thus, when the power supply is turned off, the reestablishment of the communication session is omitted without affecting a protocol sequence. Consequently, time required to turn off the power supply can be reduced.

That is, the protocol sequence of the reestablishment of the communication session can be prevented from being interrupted. Thus, a load imposed on the network 30 can be reduced.

Also, in a case where a communication session is reestablished when the power supply is subsequently turned on, and where the parameters are left at the network 30, it is unnecessary to again perform several processes, such as the calculation of the parameters. The reestablishment of the communication session can quickly be achieved. The burden imposed on the network can be reduced as much as possible.

Incidentally, in the foregoing description, for simplicity of description, the terms "communication session", "physical connection", and "data link" are used. However, the invention can be applied to a communication system, which employs a "session layer", a "connection layer" that is closer to a physical layer than the physical connection, and a PPP in place of the communication session, the physical connection and the data link, respectively, according to the EVDO defined in 3rd Generation Partnership Project 2 (3GPP2).

What is claimed is:

1. A communication terminal comprising:
a radio control portion which performs a radio communication according to a communication system adapted to establish a communication session by sending a parameter used for a communication to a network,
and also performs a reconnection process even when the communication session is released to keep the communication session established, regardless of presence/absence of information to be communicated,
wherein the radio control portion is configured to:
  determine, before releasing the communication session, whether release of the communication session is based on a process of turning-off a power supply for the communication terminal;
  perform a process of releasing the communication session when the radio control portion determines release of the communication session is not based on the process of turning-off the power supply; and
  turn off the power supply without performing the process of releasing the communication session when the radio control portion determines that release of the communication session is based on the process of turning-off the power supply.

2. A communication terminal comprising:
a radio control portion which performs a radio communication according to a communication system adapted to perform a communication by sequentially establishing a radio physical connection, a communication session, which determines a communication condition by sending a parameter used for a communication to a network, and a data link, which transmits and receives data, between the network and the communication terminal, and also performs a reconnection process when the communication session is released to keep the communication session established, regardless of presence/absence of information to be communicated, and
wherein the radio control portion is configured to:
  when in a state in which the communication session and the data link are established, determine, before releasing the communication session, whether release of the communication session and the data link is based on a process of turning-off a power supply for the communication terminal;
  perform a process of releasing the communication session and a process of releasing the data link when the radio control portion determines release of the communication session and the data link is not based on the process of turning-off the power supply; and
  release the data link and turns off the power supply without performing the process of releasing the communication session when the radio control portion determines release of the communication session and the data link is based on the process of turning-off the power supply.

3. A communication terminal comprising:
a transmitting/receiving portion which performs a radio communication according to both of a first communication system adapted to perform a communication by establishing a radio physical connection by the communication terminal, and then sending a parameter used for a communication to the network to thereby establish a communication session, and subsequently establishing a data link, and a second communication system adapted to performing a communication by sending the parameter to the network when the physical connection is established and establishing a data link; and a radio control portion which controls the transmitting/receiving portions, wherein the radio control portion controls the transmitting/receiving portion to:

when the communication session in the first communication system is released, perform a reconnection process to keep the communication session established, regardless of presence/absence of data to be communicated;

when in a state in which the communication session and the data link are established determine, before releasing the communication session, whether release of the communication session and the data link is based on a process of turning-off a power supply for the communication terminal;

perform a process of releasing the communication session and a process of releasing the data link, when the radio control portion determines that release of the communication session and the data link is based not on the process of turning-off the power supply; and release the data link and turn off the power supply without performing the process of releasing the communication session when the radio control portion determines that release of the communication session and the data link is based on the process of turning-off the power supply.

4. The communication terminal recording according to claim 3, wherein the radio control portion performs a standby operation according to the second communication system, and when transition of the second communication system to the first communication system is instructed according to the second communication system, establishment of the data link is enabled according to the first communication system.

5. The communication terminal as in any one of claims 1 to 4, wherein when turning on the power supply is instructed after the power supply is turned off, the radio control portion reestablishes the communication session in a case where the parameter relating to the communication session which is established before the power supply is turned off is left in the network.

6. A communication method performed in a communication terminal comprising a radio control portion which performs a radio communication adapted to perform a communication by sequentially establishing a radio physical connection between a network and the communication terminal, and then establishing a communication session by sending a parameter used for a communication to the network through the physical connection, and subsequently establishing a data link which transmits and receives data and also performs a reconnection process, regardless of presence/absence of information to be communicated, said communication method comprising:

causing the radio control portion to perform;

receiving a power-supply-off instruction;

when in a state in which the communication session and the data link are established determining, before releasing the communication session, whether release of the communication session and the data link is based on the process of turning-off a power supply for the communication session;

performing a process of releasing the communication session and a process of releasing the data link when the radio control portion determines that release of the communication session and the data link is based not on the process of turning-off the power supply; and releasing the data link without releasing the communication session when the radio control portion determines that release of the communication session and the data link is based on the process of turning-off the power supply.

7. The communication method performed in the communication terminal according to claim 6, further comprising:

causing the radio control portion to perform;

receiving a power-supply-on instruction;

when the power supply is turned on, establishing the physical connection; and when the physical connection is established, reestablishing the communication session in a case where the parameter relating to the communication session which is established before the power supply is turned off is left in the network.

* * * * *